US006450866B1

(12) United States Patent
Nieschulze

(10) Patent No.: US 6,450,866 B1
(45) Date of Patent: Sep. 17, 2002

(54) SHARPENING APPARATUS

(75) Inventor: Henrik Nieschulze, Wieren (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/521,807

(22) Filed: Mar. 9, 2000

(30) Foreign Application Priority Data

Mar. 11, 1999 (DE) ......................................... 199 10 757

(51) Int. Cl.[7] ................................................. B24B 7/00
(52) U.S. Cl. ............................ 451/65; 451/66; 451/69; 451/70
(58) Field of Search ............................... 451/65, 66, 69, 451/70

(56) References Cited

U.S. PATENT DOCUMENTS

| 3,811,232 A | * | 5/1974 | Reuter |
| 4,189,875 A | * | 2/1980 | Flenniken |
| 4,503,643 A | * | 3/1985 | Johnson et al. |
| 4,834,303 A | | 5/1989 | McClure et al. |

FOREIGN PATENT DOCUMENTS

| GB | 2028191 | 3/1980 |

* cited by examiner

Primary Examiner—Timothy V. Eley
Assistant Examiner—Willie Berry, Jr.

(57) ABSTRACT

A sharpening apparatus for sharpening the blades of a forage harvester chopper drum includes a carriage to which is mounted a grindstone carrier that holds a grindstone that is moved across the chopper drum during sharpening operation. The grindstone carrier includes an element which is mounted to the carriage for movement towards the chopper drum in order to advance the grindstone. The carrier element contains a threaded bore in which is received a threaded shaft that has a ratchet wheel fixed to it. A pawl is located in the path of movement of the ratchet wheel so as to be engaged thereby when the carriage reaches a reversal point at one side of the drum, this engagement causing the ratchet wheel to be rotated by an angular distance occupied by one tooth so that the threaded shaft causes the grindstone carrier to move axially therealong and toward the chopper drum so as to advance the grindstone. In one embodiment the element of the carrier is cylindrical and is received in a cylindrical opening in the carriage and fixed therein against rotation by a pair of feather keys. In a second embodiment, the element of the carrier is a block, with the block and the carriage having cooperating surfaces which guide the movement of the carrier towards the chopper drum while preventing any rotation of the carrier about the axis of the threaded shaft.

4 Claims, 6 Drawing Sheets

SHARPENING APPARATUS

BACKGROUND OF THE INVENTION

The invention concerns a sharpening apparatus with a grindstone, retained in a grindstone holder mounted to a carriage, which is supported in bearings so that it can be moved in a first direction, and coupled to an in-feed arrangement for movement in a second direction that differs from the first direction, in order to feed the grindstone towards a knife.

Various sharpening apparatus for knives have become known in the state of the art. U.S. Pat. No. 4,834,303, issued to McClure et al. on May 30, 1989, discloses a sharpening apparatus for knives of a forage harvester wherein a grindstone is mounted in a cylindrical holder provided with an external thread. The external thread is screwed into a corresponding thread of a carriage. The carriage is connected to a ratchet wheel, locked with respect to torque. The carriage is moved over the width of the knives during the sharpening and moves the ratchet wheel against a pawl, when a reversal point is reached, causing the wheel to rotate by one tooth, so that the grindstone is fed towards the knife on the basis of the pitch of the thread. Here, the grindstone rotates so that after each in-feed process another partial surface of the grindstone comes into contact with the knife. Since the grindstone wears during sharpening, a notch is produced which is rotated with each in-feed process, so that finally only a small part of the surface of the grindstone comes into contact with the knives. The disadvantages that result are vibrations, greater wear of the grindstone and non-uniform sharpening.

Another sharpening apparatus is disclosed in GB-A-2,028,191 which includes a grindstone secured in a holder that is fastened to a carriage that can be moved over the width of the knives, and the in-feed of the grindstone is performed by a movement of the entire carriage arrangement. Here the grindstone is not rotated during the in-feed process, however, the mechanical configuration is rather complex and costly, since the entire carriage arrangement must be moved while maintaining parallelism between the knives and the path of movement of the grindstone.

SUMMARY OF THE INVENTION

According to the present invention, there is provided a forage harvester chopper knife sharpening apparatus constructed so as to overcome the disadvantages, noted above, that are associated with the prior art.

An object of the invention is to provide a sharpening apparatus including a carriage to which is mounted a grindstone holder which may be in-fed towards the chopper drum without rotating the grindstone and without necessitating any movement of the carriage other than a to-and-fro movement parallel to the axis of rotation of the chopper drum.

A more specific object of the invention is to provide grindstone fixed to the bottom of a grindstone holder having a first element containing a threaded bore in which is threaded a second element, forming part of an in-feed apparatus and being in the form of a shaft having external threads, with the first element being free to move axially of said second element but being fixed against rotation, and with the second element having a ratchet wheel fixed thereto for engagement by a pawl that rotates the ratchet wheel thereby rotating said second element so as to in-feed the holder towards the chopper drum when a carriage transporting the holder reaches an end reversal position during sharpening operation.

These an other objects of the invention will become apparent from a reading of the ensuing description together with the appended drawings.

BRIEF DESCRIPTION OF THE DRAWINGS

FIG. 3 is a top plan view of the sharpening apparatus showing the grinding arrangement in solid and dashed line end reversal positions like in FIG. 2a.

DESCRIPTION OF THE PREFERRED EMBODIMENT

Figure 1:
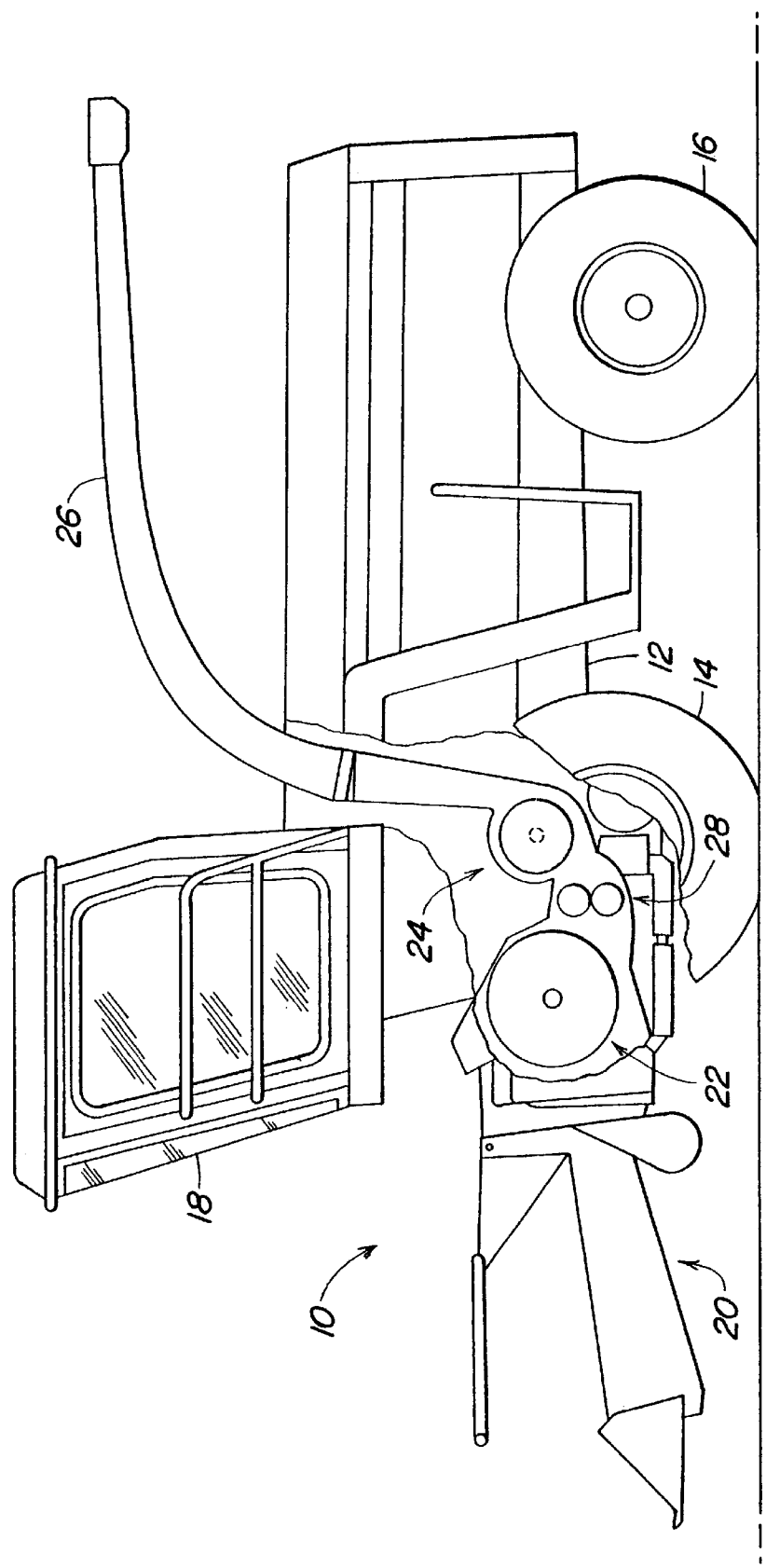
FIG. 1 is a schematic side elevational view of a harvesting machine with a chopper drum and a sharpening apparatus.

A harvesting machine 10 is shown in FIG. 1 in the form of a self-propelled forage harvester. The harvesting machine 10 includes a frame 12 that is carried by front and rear wheels 14 and 16, respectively. The harvesting machine 10 is controlled from an operator's cab 18 from which a crop recovery arrangement 20, at the front of the machine, can be viewed. Crop, for example corn, grass or the like, taken up from the ground by means of the crop recovery arrangement 20 is conducted to a chopper drum 22 that chops the crop into small pieces and passes it along to a conveyor arrangement 24. The crop leaves the harvesting machine 10 to an accompanying trailer through a pivoted discharge pipe 26. A post-chopper reducing arrangement 28 is located between the chopper drum 22 and the conveyor arrangement 24 by means of which the crop conveyed is delivered tangentially to the conveyor arrangement 24. However, the position of the post-chopper reducing arrangement 28 is not critical so that it may also be provided downstream of the conveyor arrangement 24. Further details of the harvesting machine 10 do not require description since this is known in itself.

Figure 2C:
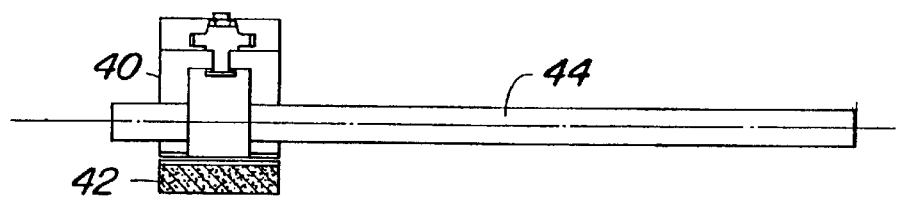
FIG. 2c shows the grinding arrangement in a park or rest position.
Figure 2B:
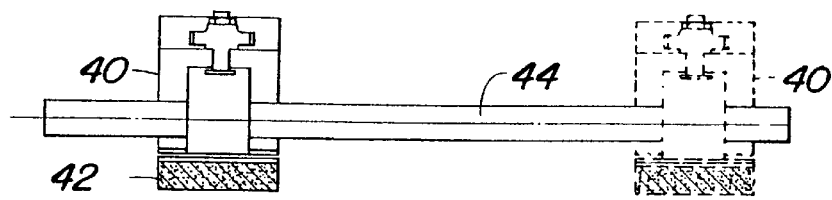
FIG. 2b shows the grinding arrangement like in FIG. 2a but with the dashed line position being a finish grinding position.
Figure 2A:
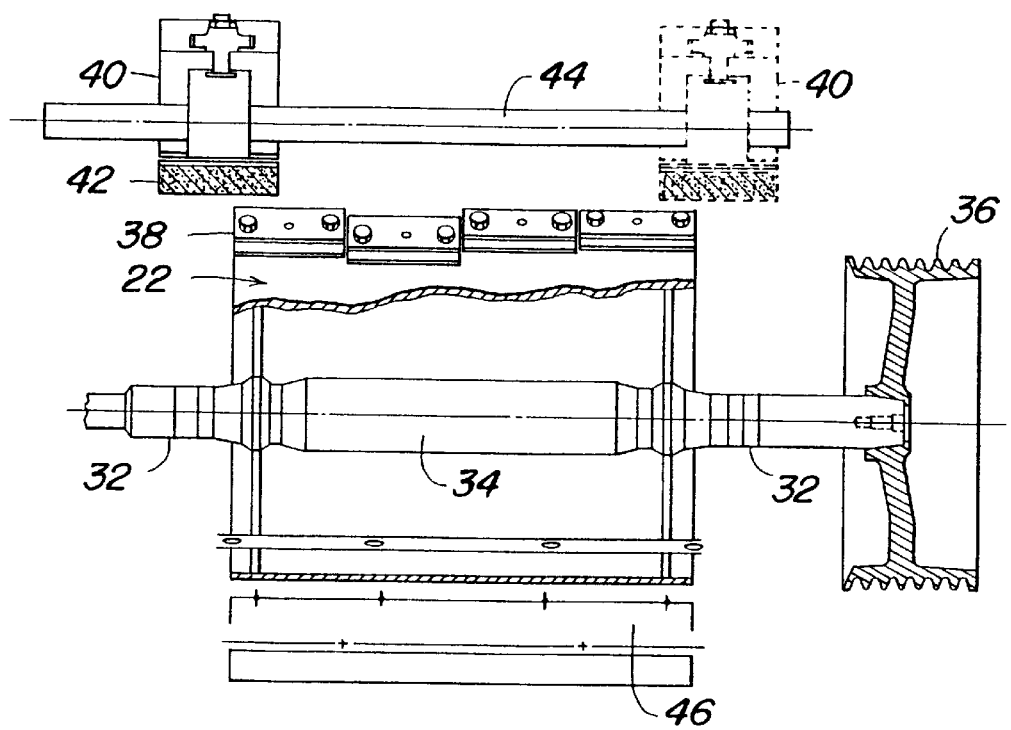
FIG. 2a is a front view of a grinding arrangement together with a chopping drum and showing one end reversal position of the grinding arrangement, assumed during sharpening operation, in solid lines and showing the other end reversal position in dashed lines.

FIG. 2a is a schematic front view of the chopper drum 22 and an associated grinding arrangement as it would be seen facing the front of the harvesting machine 10 in FIG. 1. The chopper drum 22 is provided with a number of knives 38 distributed over its width and its circumference that reduce crop taken up by the crop recovery arrangement 20 by interacting with a rigid shear bar 46. The chopper drum 22 comprises a central shaft 34 having a belt pulley 36 fixed on one end. The chopper drum 22 can be rotated by a belt drive including a belt extending between the belt pulley 36 and a further belt pulley, not shown, that is coupled for being driven by a motor of the harvesting machine 10. The shaft 34 is supported in a pair of bearings respectively arranged at either side of the chopper drum 22, as at locations 32, on the frame 12 of the harvesting machine 10. Critical to desired cutting performance of the chopper drum 22 is the distance between the cutting edges of cutting knives 38 and the shear bar 46 and the sharpness of the knives 38. If the clearance between the knife cutting edges and the shear bar 46 is too small, the knives 38 could be damaged. If the clearance is too large, the crop brought in cannot be properly chopped.

The present invention deals with the second problem, the sharpness of the knives 38. In order to be able to sharpen the knives 38 after a given operating time interval, without having to disassemble the individual knives 38 or the entire chopper drum 22, a sharpening apparatus is provided above the chopper drum 22 near the enveloping cylinder described by the knives 38. The sharpening apparatus includes a grinding arrangement comprising generally a carriage 40 supporting a grindstone 42, and an axle 44, disposed parallel to the chopper drum shaft 34, on which the carriage 40 is supported by bearings so as to move axially.

FIGS. 2a through 2c are intended to clarify the method of operation of the sharpening apparatus. If the knives 38 are to be sharpened, the chopper drum 22 is brought into rotation, as a rule in the opposite direction of operation and/or at a reduced rotational speed, compared to normal chopper operation. The grindstone carriage 40 with the attached grindstone 42 is moved from a rest or park position shown in FIG. 2c, in which it is arranged alongside the chopper drum 22, over the entire width of the chopper drum 22. Thereby the underside of the grindstone 42 contacts and sharpens the knives 38. A grinding process is performed in such a way that the grindstone 42 is moved back and forth several times over the width of the chopper drum 22. The end points of this movement are illustrated in FIG. 2a, with the grindstone carriage 40 and carried elements being shown in solid lines at its left reversal point and in dashed lines at its right reversal point. It can be seen how far the reversal points exceed the dimensions of the chopper drum 22. Between the movements, the carriage 40 with the grindstone 42 as a rule pauses in the end positions for a certain time interval, in order that more blade material will be ground away to take into account the fact that at the ends of the chopper drum 22 less crop material is normally chopped than in the center, so that the knives 38 in the outer portions are worn less. Thus, by removing additional material from the knives 38 at the ends of the chopper drum 22, these knives will become like those over the remainder of the width of the drum 22 and will cooperate with them to trace an equal enveloping circle. This time interval can also be adjusted. Between the movements, the grindstone 42 is in-fed, that is, it is given a small movement towards the knives 38. After the grinding itself, the grinding process is completed by a so-called planing or finishing step. Here the grindstone 42 is no longer in-fed but remains in its position. This completion process is performed with several axial movements of the grindstone 42 between the end positions shown in FIG. 2b. The number of such movements is variable, typically five movements are performed. The right reversal point of the grindstone carriage 40 with the grindstone 42, shown in dashed lines in FIG. 2b, is somewhat further to the left than that in FIG. 2a (that is, during the normal sharpening), where the carriage 40 is also shown in dashed lines. As a result, at the right reversal point in FIG. 2b no in-feed of the grindstone 42 occurs in contrast to FIG. 2a. A more detailed description of the in-feed process is given below. With respect to the FIGS. 2a, 2b, and 2c, it should be noted that, except for the grindstone 42, the grinding arrangement is always arranged at a fixed vertical height above the chopper drum 22, as is shown in FIG. 2a.

Figure 3:
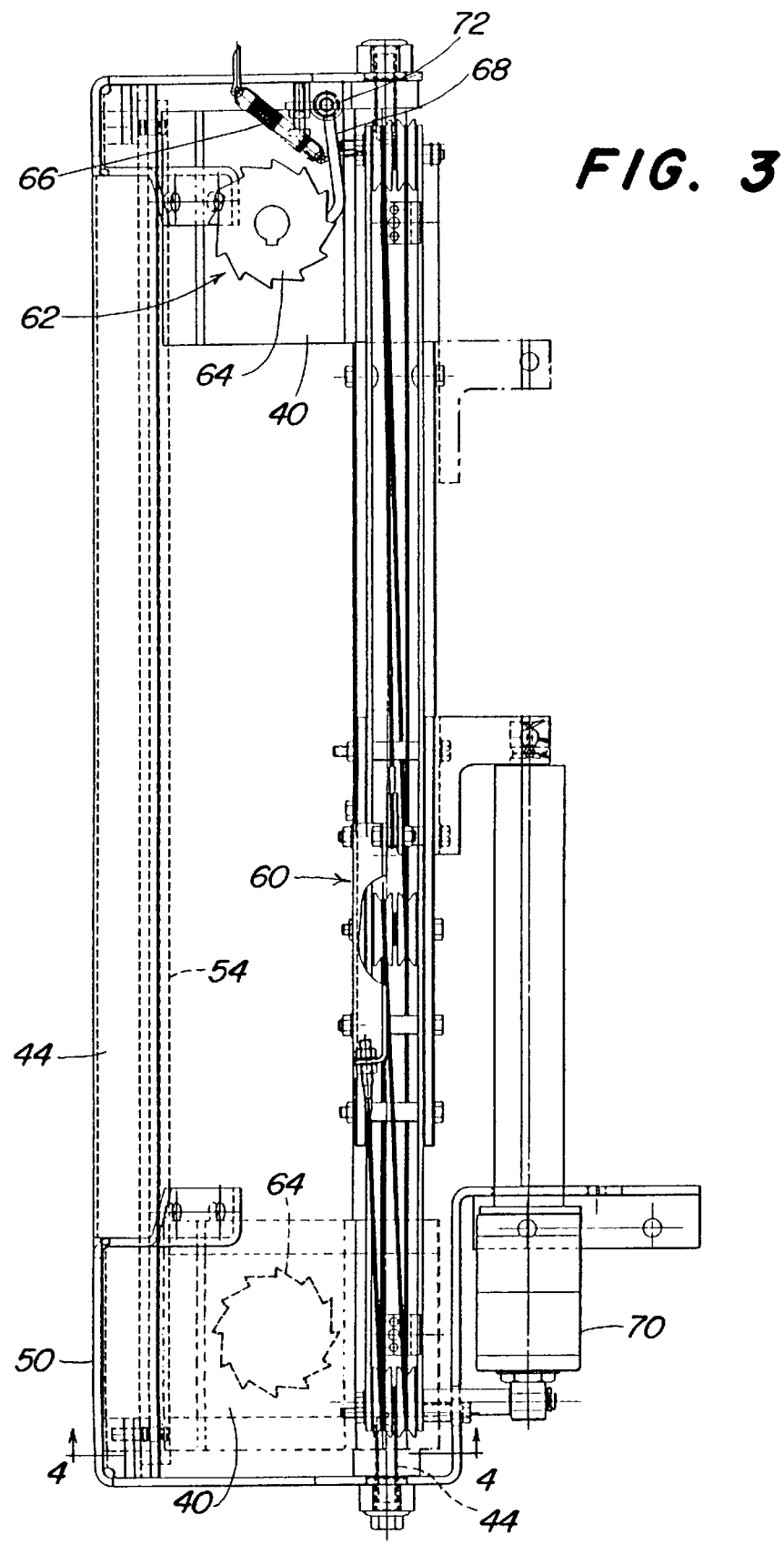
Figure 4:
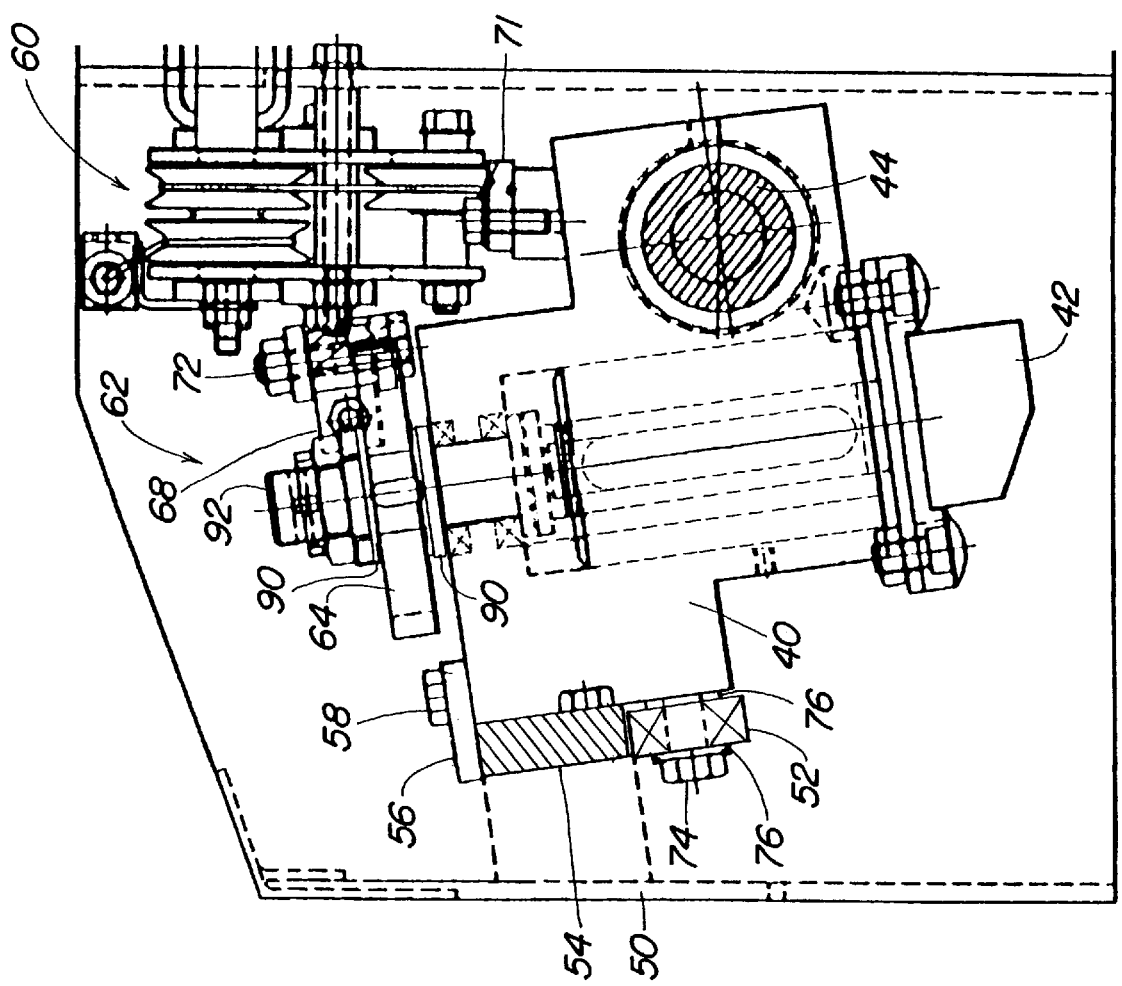
FIG. 4 is a partial vertical sectional view taken along the line 4—4 of FIG. 3 and showing a first embodiment of the grinding arrangement in its end reversal position where the ratchet wheel of the in-feed mechanism is engaged by the pawl.

FIG. 3 is a top view of the sharpening apparatus with the grindstone carriage 40 being respectively shown in solid lines in the right reversal position and in dashed lines in the left reversal position. The sharpening apparatus includes the grindstone carriage 40 which is supported on the one hand on the axle 44 and on the other hand on a rail 54 that is connected to a housing or frame 50 of the grinding arrangement. Referring now also to FIG. 4, which is an enlarged vertical sectional view taken transversely through the axle 44 and rail 54 along line 4—4, as shown in FIG. 3, it can be seen that the rail 54 extends horizontally in parallel relationship to the axle 44. The rail 54 is rectangular in cross section and is arranged such that lower and upper parallel sides thereof are approximately horizontal and respectively engaged by rollers 52, in the form of ball bearings, and by a pressure pad plate 56 connected to the carriage 40.

During sharpening or grinding operation, an upward directed force results which is applied against, and transferred through, the grindstone 42 to the carriage 40 to urge the latter against the axle 44 and to urge the rollers 52 against the lower surface of the rail 54. In order to increase its durability and to prevent undesired tilting moments, three, or at least two, rollers 52 may be arranged in spaced side-by-side relationship in a direction along the length of the rail 54 with each being secured to the grindstone carriage 40 by a cap screw 74 and a pair of washers 76 respectively located at opposite sides of the roller 52. The pressure pad plate 56 is connected by several cap screws 58, three for example, of which only one is shown, to the grindstone carriage 40, and is used generally to prevent the carriage 40 from tilting in the counterclockwise direction about the axle 44, as viewed in FIG. 4, at a time when no grinding process is being performed, for example, in the park position.

In order to move the grindstone carriage 40 across the width of the chopper drum 22, a rope pull arrangement 60 is provided that includes an electrically driven linear motor 70 that is coupled for effecting shifting movements of a rope that is coupled to the grindstone carriage 40 by a clamp 71, the rope acting in response to selected operation of the motor 70 to move the carriage 40 along the axle 44 and rail 54. The rope pull arrangement 60 is known in itself and hence does not require any more detailed explanation. As an alternative, it is also conceivable that the grindstone carriage 40 could be moved by a circulating chain driven by a motor, as disclosed in the aforementioned U.S. Pat. No. 4,834,303.

Figure 5:
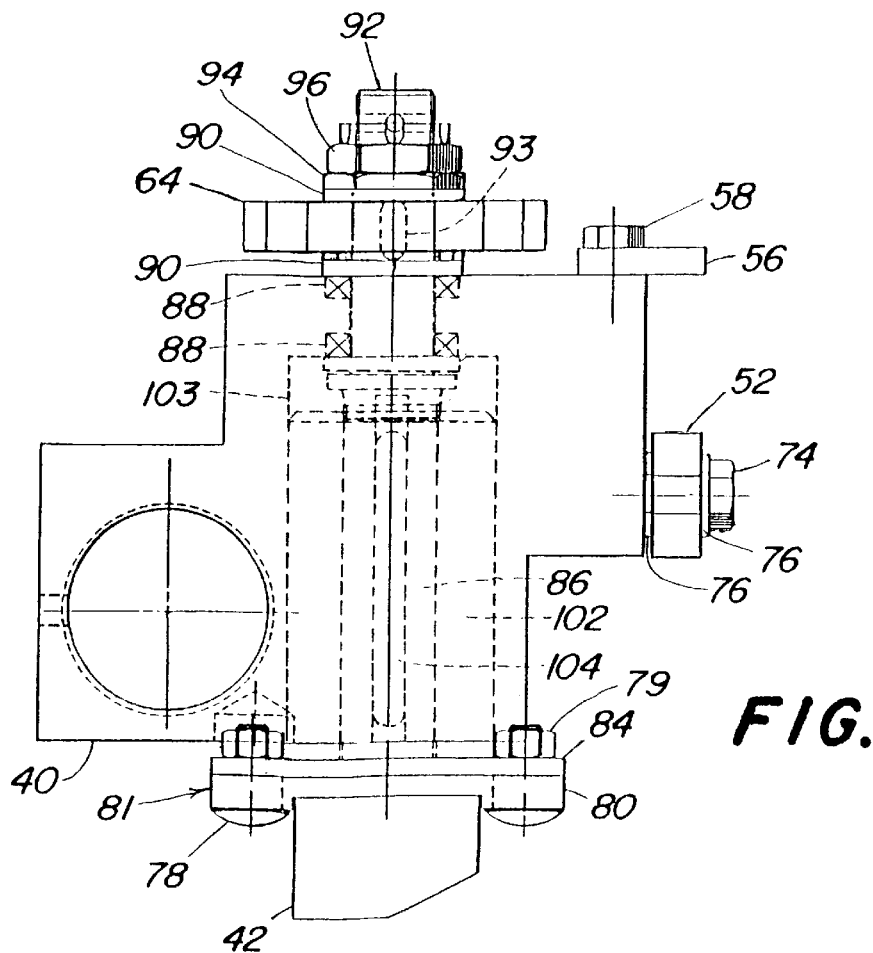
FIG. 5 is an elevational view of the grinding arrangement shown in FIG. 4, but oriented slightly differently so that the in-feed shaft projects vertically.
Figure 6:
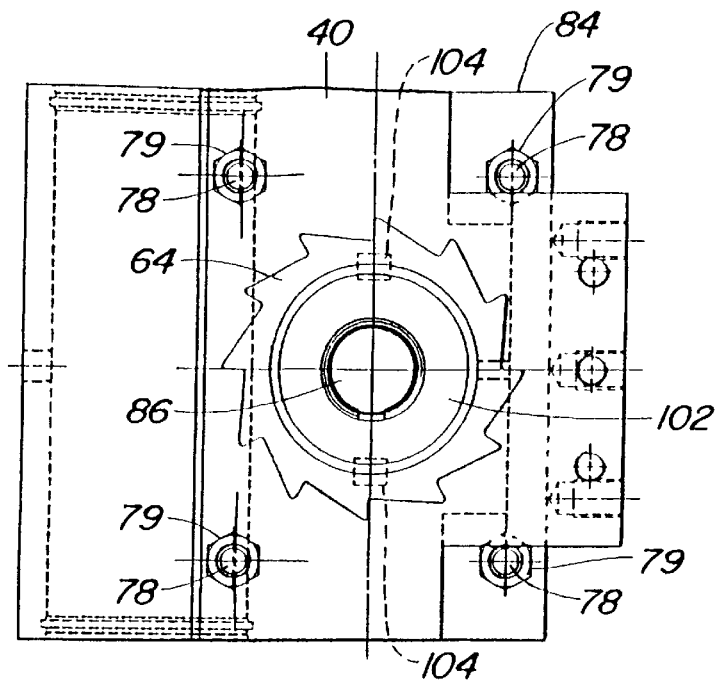
FIG. 6 is a top plan view of the grinding arrangement shown in FIG. 5.

FIGS. 3–6 show a first embodiment of an in-feed arrangement 62, which causes the grindstone 42 to be adjusted towards the chopper drum when the grindstone carriage 40 is at its right reversal position, as indicated in dashed lines in FIG. 2a. Specifically, the in-feed arrangement 62 comprises a ratchet wheel 64 and a pawl 68 that is attached, as by a pin 72, to the frame 50 for pivoting about an axis, extending parallel to the axis of rotation of the ratchet wheel 64, and is retained in a rest position by a spring 66. The pawl 68 is so located and arranged relative to the ratchet wheel 64 that it engages a respective tooth of the ratchet wheel 64, when the grindstone carriage 40 approaches its reversal position, and rotates the wheel 64 by one tooth in the clockwise direction, as viewed in FIG. 3. The pawl 68 and the ratchet wheel 64 are shaped in such a way that an angled end of the pawl 68 initially engages in the valley between two teeth of the ratchet wheel 64 and is forced outward, against the force of the spring 66 after a certain angular rotation, by the increasing outer ramp of the following ratchet wheel tooth. The flanks of the teeth of the ratchet wheel 64 are shaped in a well-known unsymmetrical, sawtooth form in order to improve the engagement and disengagement of the pawl 68. The angle through which the ratchet wheel 64 rotates, as a result of engaging the pawl, is 360° divided by the number of teeth, here being twelve, as best shown in FIGS. 3 and 6. Hence, the illustrated ratchet wheel 64 is rotated through one tooth, i.e. 30° in the clockwise direction when the grindstone carriage 40 reaches its reversal point, as shown in dashed lines in FIG. 3. By an appropriate mechanism described below, the rotation of the ratchet wheel 64 is converted into a linear in-feed motion of the grindstone 42. If the grindstone carriage 40 is not completely moved into its reversal position but the movement is interrupted shortly before that, as is indicated in FIG. 2b, the pawl 68 does not come into contact with the ratchet wheel 64, and the in-feed process of the grindstone 42 does not occur. This is the case when the grinding assembly is operating to achieve finish grinding of the chopper knives 38. The ratchet wheel 64 may be exchanged with other wheels with differing numbers of teeth, in order to be able to vary the angle of rotation and thereby the amount of in-feed, for example, to compensate for different grindstone and/or knife materials.

The structure for achieving in-feed of the grindstone 42 as a result of turning or indexing the position of the ratchet wheel 64 will now be described with reference to FIGS. 4, 5 and 6. The grindstone 42 is secured for movement with a grindstone holder 81 including first and second rectangular plates 80 and 84, respectively, and a first element 102. Specifically, the grindstone 42 is fixed, as by adhesive, for example, to the underside of the first plate 80. The first and second plates 80 and 84 are superposed and provided with aligned bores at their four corners, with each aligned pair of holes receiving an upwardly inserted bolt 78 having a nut 79 screwed onto its upper end so as to clamp the plates together and to be removable. The first element 102, which is in the form of a cylinder, extends nearly vertically upward from, and has its base fixed to, the upper plate 84. The first element 102 is located within a smooth cylindrical bore 103 provided in the carriage 40 and contains a threaded bore, extending axially therein from its top, into which an externally threaded second element 86, in the form of a cylindrical shaft defining part of the in-feed structure, is screwed. It is to be noted that the first and second elements 102 and 86 could just as well be configured to respectively allow the threads to be on the exterior of the first element and on the interior of the second element without changing the principle of operation, i.e., rotation of the second element causing translation of the first element. Both threads in this case are left-hand threads. If right-hand threads should be employed, the direction of rotation of the ratchet wheel 64 must be reversed, which can be accomplished by reversing the ratchet wheel 64 and repositioning the pawl 68. The second element 86 is located within a reduced in diameter upper end section of the bore 104 and is supported therein for rotation by upper and lower ball bearings 88, but is supported so as to be axially fixed. The ratchet wheel 64 is received on an upper section 92 of the second element 86 and is secured for rotating with the element 86 by a key, for example (not shown), located in a keyway 93. The ratchet wheel 64 is held in proper axial position on the element 86 by washers 90, here shown two in number with one located below and one located above the ratchet wheel 64. The ratchet wheel 64 is fixed in its axial position by a first nut 94, which is threaded onto the upper section 92 of the first element 86 and engaged with the upper washer 90, and by a castellated nut 96 threaded onto the upper section and engaged with the first nut 94, the nut 96 being secured against rotation by a cotter pin (not shown) located in a cross bore provided in the upper section 92 and received in a set of aligned notches in the castellated nut 96.

For preventing the grindstone holder 81 from rotating with the second element 86, the outer circumference of the cylindrical first element 102 and/or the inner circumference of the region of the grindstone carriage 40 surrounding the first element 102, are provided with two diametrically opposite, axially extending keyways or grooves in which are received feather keys 104. The feather keys 104 permit a sliding of the first element 102 of the grindstone holder 81 along and relative to the second element 86, while preventing the first element 102 from rotating about its axis. In this embodiment, arrangements for the lubrication of the first element 102 can be provided at the feather keys 104 and for the threaded connection with the second element 86. Thus, the first element 102 slides downward with the grindstone 42 upon a rotation of the ratchet wheel 64, but does not rotate about its axis so as to rotate the grindstone 42 out of its desired sharpening position.

While the above-described in-feed structure is that preferred because of its simplicity, other structures may be used to cause the linear movement of the grindstone 42. For example, a rod (in the form of a connecting rod) linked at one end to a ratchet wheel and at its other end to the grindstone holder may be considered. Or a ratchet wheel coupled so as to drive a pinion of a rack and pinion gear set, where the rack is formed as part of the grindstone holder may be used for effecting linear movement of the grindstone.

Figure 7:
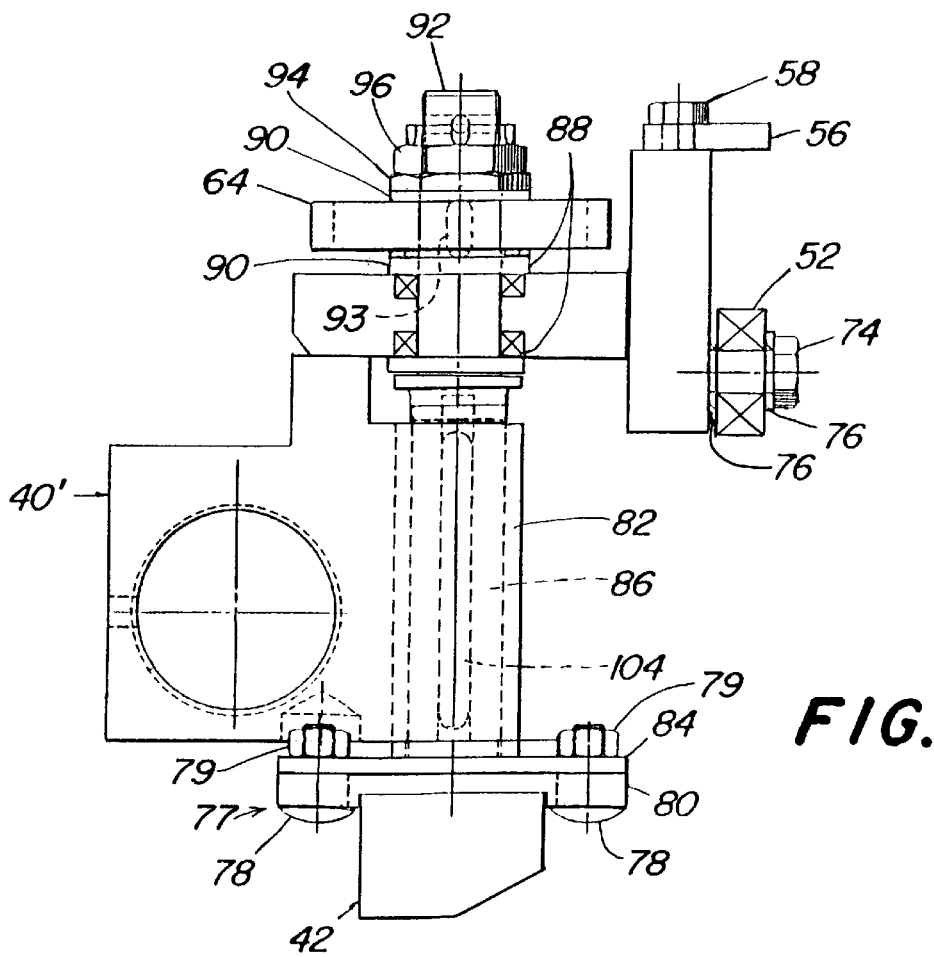
FIG. 7 is an elevational view like FIG. 5 but showing a second embodiment of the grinding arrangement.
Figure 8:
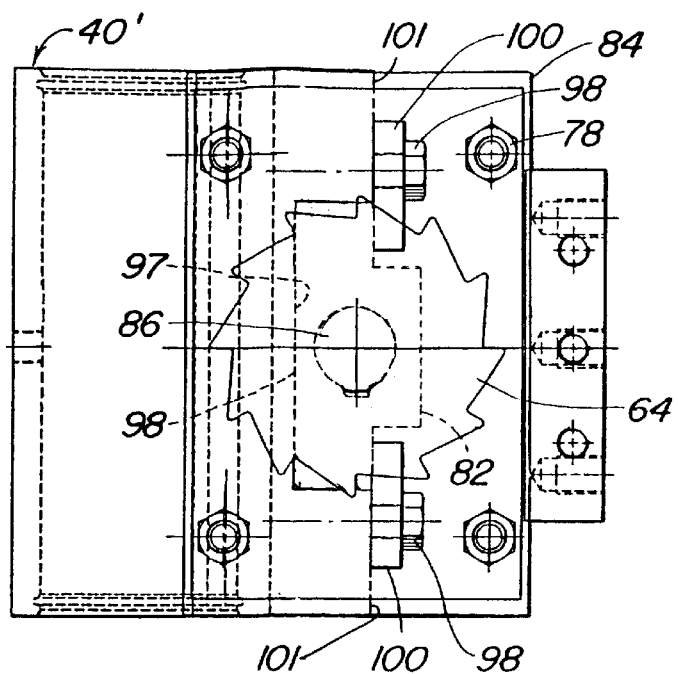
FIG. 8 is a top plan view of the grinding arrangement shown in FIG. 7.

A second embodiment of the invention is shown in FIGS. 7 and 8 and differs from the embodiment disclosed in FIGS. 4–6 mainly in the construction of the grindstone holder and the carriage for accommodating this different holder structure. It is to be noted that various elements that make up the second embodiment are the same as those of the first embodiment and these are given the same reference numerals. Thus, the second embodiment includes a grindstone holder 77 including the first and second plates 80 and 84 and a first element 82 in the form of a stepped block. Like the first embodiment, the plates 80 and 84 are secured to each other by the bolts 78 and nuts 79. The second plate 84 is secured to the bottom of the first element 82, the latter extending upward and containing a nearly vertical bore which is threaded and receives the threaded exterior of the shaft which constitutes the second element 86. The first element 82 is supported for moving upwardly along bearing surfaces defined by a carriage 40' and is locked against rotation relative to the second element 86. For these purposes, it can be seen from FIG. 8 that the carriage 40' includes a pair of vertical ribs 101 respectively spaced equally from the axis of rotation of the second element 86 and respectively having planar vertical side surfaces facing each other and arranged perpendicular to a vertical, planar surface 97 extending between respective bases of the ribs 101. Mounted to an outer vertical surface of each rib 101, as by a cap screw 98, is a locking plate 100 having an end portion which projects beyond the vertical side surface in parallel spaced relationship to the surface 97. As viewed in FIG. 8, it can be seen that the first element 82 has a first planar surface 98 extending between the ribs 101 and engaged with the planar surface 97 of the carriage 40'. On the side opposite this surface 98, the first element 82 is provided with three sections, formed in steps, of which the central section is spaced a larger distance from the surface 97 of the carriage 40', than the other two sections and contains the threaded bore receiving the second element 86. Accordingly, the fist element 82 is somewhat T-shaped in cross section, with the top of the T being slidably engaged with the bearing surfaces defined by the surface 97, the surfaces of ribs 101 facing each other and the lock plates 100. Held like it is for vertical sliding movement, the first element 82 is also held from rotating about the second element 86. Another difference between the two embodiments can be seen by comparing FIGS. 5 and 7 where it is evident that the plate 56 and rollers 52 for locating the carriage 40 on the rail 54 (FIG. 5) are at a lower elevation than they are for locating the carriage 40' on the rail 54 (FIG. 7). This difference in carriage structures is necessary to accommodate the different first elements 102 and 82 but there is no significant difference in operation which results from this.

A simple control is provided for controlling the electric motor 70 so as to selectively move the carriage 40 or 40' between the end reversal positions shown in FIG. 2a, where the right position is a reversal position where operation of the in-feed apparatus 62 takes place, or between the end positions shown in FIG. 2b where the right position is an end planing or finishing reversal position where no in-feed operation takes place. This simple control can be performed, for example, by the number of activation impulses applied to the motor 70 (in particular in the case of a step motor) or a time interval, during which an operating voltage is applied to the motor or a change in direction of the position of the grindstone holder and/or a translational movement or a rotary movement of the shaft by the motor 70 with corresponding control of the motor. Thereby, it is easy to control whether an in-feed of the grindstone is performed or not. It should be noted that the grindstone retainer must be moved in the opposite direction of movement of the motor, for example, a direct current motor would merely require reversal of its polarity to reverse its drive output.

Accordingly, in both embodiments of the invention, the carriage 40 or 40' remains a fixed distance above the chopper drum 22, and an in-feed of the grindstone 42 towards the knives 38 is possible by rotation of the ratchet wheel 64 without any rotation of the grindstone holder 81 or 77. Therefore, the entire surface of the grindstone 42 remains in position, after each in-feed operation, for contacting the surfaces of the knives 38 that are to be ground. Thus, little structural expense is required for attaining this operation which is advantageous for the reasons that there is reduced wear of the grindstone, more rapid, better quality grinding, and a reduction of the vibrations which are attendant with arrangements in the prior art where the grinding operation results in the surface of the grindstone becoming non-uniform.

What is claimed is:

1. In a sharpening apparatus, for sharpening knives of an ensilage harvester chopper rotatable about a fixed axis, including a frame with guide rails supporting a carriage adapted for moving back and forth along a given path established by said guide rails, a grindstone holder including a first element, an in-feed assembly including a second element mounted to said carriage for rotation about a second axis extending crosswise to said path and having a threaded connection with said first element, whereby said grindstone holder is supported for being transported by said carriage between reversal end points located along said path, during a sharpening operation, and for being in-fed towards said knives in response to an in-feed rotation being applied to said second element, the improvement comprising: a locking structure acting between said carriage and said first element for preventing rotation of said first element about said second axis while permitting translation of said first element along said second axis.

2. The sharpening apparatus defined in claim 1 wherein said first element of said grindstone holder is an elongate cylindrical member; said carriage having a smooth cylindrical bore receiving said cylindrical member for axial movement therein; and said locking structure including at least one feather key securing said cylindrical member against rotation within, while permitting movement axially along, said cylindrical bore.

3. The sharpening apparatus defined in claim 1 wherein said grindstone holder and carriage respectively include first and second flat surfaces extending crosswise to said guide path, with said first surface being slidable along said second surface.

4. The sharpening apparatus defined in claim 3 wherein said carriage includes a pair of ribs located at opposite sides of, and projecting perpendicular to, said second surface; each of said ribs including a third surface extending parallel to said second surface; said holder having first and second surface areas respectively located adjacent said third surfaces such that they cooperate to define said locking structure; and a pair of retainer plates respectively secured to said ribs and engaging said first and second surface areas so as to define a guide for permitting said holder to move only in said direction crosswise to said path.

* * * * *